United States Patent [19]
Lee et al.

[11] Patent Number: 5,577,215
[45] Date of Patent: Nov. 19, 1996

[54] DATA TRANSMISSION CIRCUIT FOR DIGITAL SIGNAL PROCESSOR CHIP AND METHOD THEREFOR

[75] Inventors: Bang-won Lee, Kwangmyeong; Dong-hoi Kim, Suwon, both of Rep. of Korea

[73] Assignee: Samsung Electronics Co., Ltd., Suwon, Rep. of Korea

[21] Appl. No.: 217,896

[22] Filed: Mar. 25, 1994

[30] Foreign Application Priority Data

Mar. 25, 1993 [KR] Rep. of Korea ................. 93-4669

[51] Int. Cl.$^6$ ................................................ G06F 13/00
[52] U.S. Cl. ........................ 395/311; 395/280; 395/281
[58] Field of Search ............................ 395/325, 280, 395/281, 311; 364/725

[56] References Cited

U.S. PATENT DOCUMENTS

| | | | |
|---|---|---|---|
| 4,873,658 | 10/1989 | Cambonie | 364/725 |
| 4,985,903 | 1/1991 | Heichler | 375/36 |
| 5,305,436 | 4/1994 | Mundkur | 395/162 |

Primary Examiner—Jack B. Harvey
Assistant Examiner—John Travis
Attorney, Agent, or Firm—Cushman Darby & Cushman, L.L.P.

[57] ABSTRACT

A data transmission circuit for a digital signal processor chip having a plurality of function blocks, a plurality of global buses which may be selectively connected to each other, and a plurality of local buses which may be selectively connected to an associated global bus and an associated function block. The circuit includes a plurality of first switches for selectively connecting the plurality of local buses to both the plurality of function blocks and the plurality of global buses, and a plurality of second switches means for selectively connecting the plurality of global buses. In a data transmission method for a digital signal processor chip, only those local buses and global buses necessary for data transmission are connected when data is transmitted between the plurality of function blocks. Therefore, movement of data through buses irrelevant to the desired operation is eliminated, and electrical consumption is reduced.

8 Claims, 2 Drawing Sheets

DATA TRANSMISSION CIRCUIT FOR DIGITAL SIGNAL PROCESSOR CHIP AND METHOD THEREFOR

BACKGROUND OF THE INVENTION

The present invention relates to digital signal processor chips, and more particularly to a data transmission circuit for a digital signal processor chip and method for transmitting data.

Recently, digital signal processor chips have become widely used as a result of the rapid development of integrated circuit technology. In particular, because of the low cost of digital signal processor chips due to large scale integration, highspeed, and improvement in the efficiency and availability of memory devices and logic devices, digital signal processor chips have been used in military, industrial, and consumer applications.

One of the most important functions of the digital signal processor chip is to process data in real time. Real time data processing requires many computation operations. The digital signal processor chip receives data, performs operations of multiplication and accumulation and outputs data as fast as possible. Digital signal processing can be performed more rapidly than analog signal processing using techniques such as high-precision and stability processing, pipeline control, and parallel processing.

The digital signal processor chip generally includes a memory device, arithmetic logic device, multiplier, register, controller, and a bus for transmitting data between the respective components. The bus includes local buses and a global bus configured so that the global bus is used for transmitting data between local buses and the local buses are used for transmitting data between associated components and the global bus.

Also, the digital signal processor chip may be capable of high-speed operation by parallel-processing the input signal using a plurality of interconnected digital signal processing chips.

In such a configuration, the bus inevitably has a complicated structure in order to appropriately connect the plurality of digital signal processor chips.

During data writing and reading operations, data may be transmitted to or output from all components via the bus. When data transmission is performed using a global bus, data is prevented from being transmitted into undesired components. In other words, the digital signal processor chip has switches for transmitting data or intercepting transmitted data. The switches prevent writing or reading data to or from undesired components during data transmission. Each switch, which is connected between the input and output terminals of the respective component and a local bus, functions as a gate which selectively forms a data transmission path.

However, in the conventional digital signal processor chip, although data transfer does not occur between components disconnected from the data transmission path, data is transmitted to both local and global buses connected to the respective components. Where data is transmitted over a short distance, this results in the unnecessary consumption of electricity.

SUMMARY OF THE INVENTION

An object of the present invention is to provide a data transmission circuit for a digital signal processor chip which connects only components relevant to data transmission.

Another object of the present invention is to provide a data transmission method for a digital signal processor chip which reduces unnecessary electricity consumption.

To accomplish the first and other objects, the present invention provides for a data transmission circuit for use in a digital signal processor chip having an internal bus, a plurality of function blocks, a plurality of local buses connected to the respective function blocks transmitting data between the function blocks, and a plurality of global buses for connecting the local buses for data transmission between the plurality of function blocks.

The data transmission circuit includes first switching means for selectively connecting the plurality of local buses and the plurality of global buses, and second switching means for selectively connecting the plurality of global buses.

To accomplish the second and other objects, the data transmission method for a digital signal processor chip according to the present invention connects only the buses necessary for data transmission, when data is transmitted between the plurality of function blocks.

In other words, according to the present invention, the buses are functionally separated for performing data transmission between the respective blocks and the separate bus sections are selectively connected by control switches.

The switches operate so that the separate bus sections between the blocks relevant to data transmission are connected during data transmission and unnecessary bus sections are disconnected from the used bus sections.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
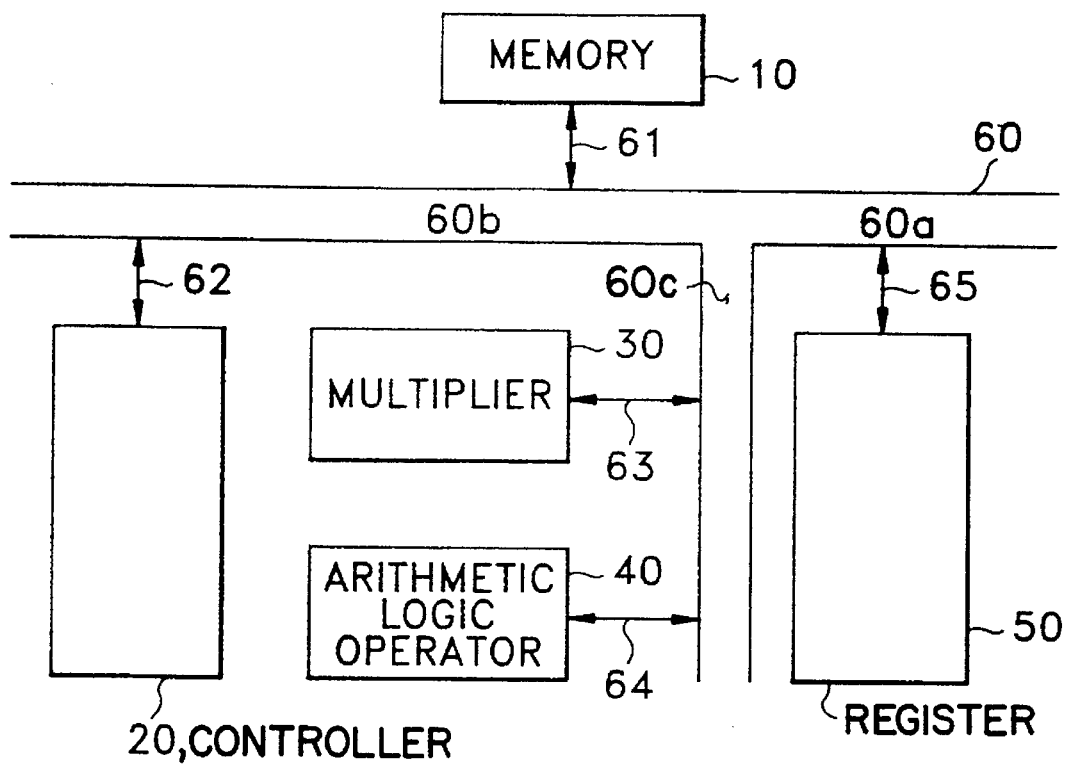
FIG.1 is a block diagram of a conventional digital signal processor chip.

In FIG.1, the conventional digital signal processor chip includes a memory 10 for storing information or control data, a register 50 for temporarily storing data, a multiplier 30 for performing multiplication of input variables, an arithmetic logic operator 40 for executing arithmetic and logical operations according to an operand of instruction words, a controller 20 for controlling all the blocks inside the digital signal processor chip, a global bus 60 for transmitting data between the respective blocks, and local buses 61, 62, 63, 64 and 65 for transmitting data between the respective blocks and the global bus 60.

The buses have parallel data lines corresponding to the number of data bits. The global bus 60 is capable of enabling signal transmission between the internal components of the digital signal processor chip or between multiple digital signal processor chips. The local buses 61, 62, 63, 64 and 65 have switches (not shown) for controlling data transfer between the input and output terminals of the respective blocks.

The global bus 60 includes three sections 60a, 60b and 60c. According to this construction, when data is transferred between blocks or computing operations are performed using data from two blocks, only the necessary bus sections are used. For example, when the information from the register 50 is moved to the memory 10, the information is moved from path 60a of the global bus 60 to path 60b. Here, path 60c is not part of the active signal path. Thus, the path 60c can be disconnected from paths 60a and 60b. Other information such as multiplier 30 and arithmetic logic operator 40 can be moved through path 60c.

Figure 2:
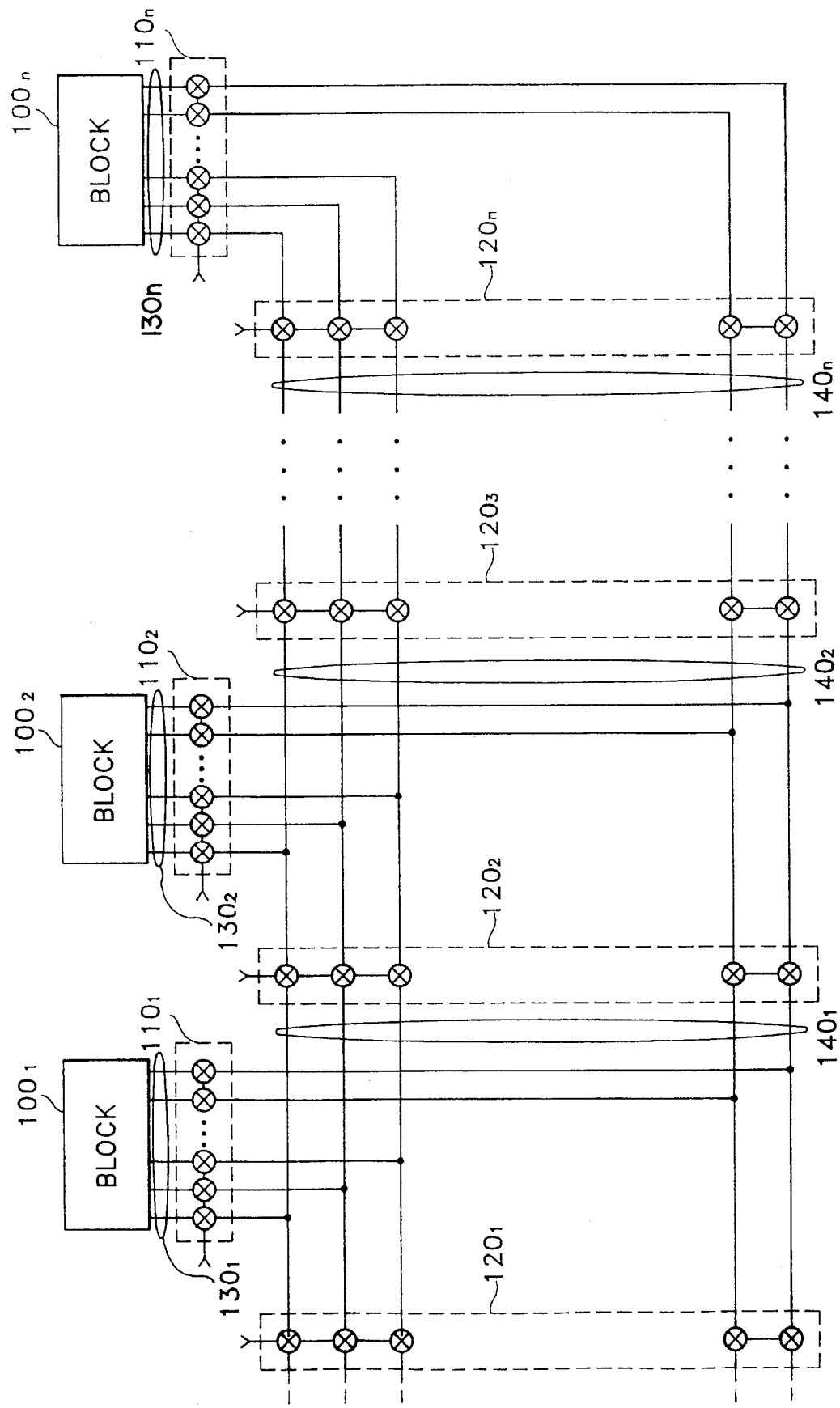
FIG.2 is a detailed block diagram of a data transmission circuit for a digital signal processor chip according to the present invention.

FIG.2 is a block diagram of the bus structure according to the present invention. In FIG.2, the bus is constituted by blocks $100_1, 100_2, \ldots 100_n$, input/output control switches $110_1, 110_2, \ldots 110_n$ for controlling data input and output, local buses $130_1, 130_2, \ldots 130_n$ connected to the input/output control switches $110_1, 110_2, \ldots 110_n$, global buses $140_1, 140_2, \ldots 140_n$, and bus control switches $120_1, 120_2, \ldots 120_n$ for controlling connection of the global buses $140_1, 140_2, \ldots 140_n$.

The global buses $140_1, 140_2, \ldots 140_n$ are separated by the bus control switches $120_1, 120_2, \ldots 120_n$. In other words, the respective blocks are connected or disconnected by the bus control switches. Thus, only the buses necessary for data transfer are connected.

The respective bus control switches $120, 120_2 \ldots 129_n$ enable the data carried on the global bus lines to move between the blocks necessary for the operation. Path to blocks unnecessary for the operation are disconnected. The respective switches may be implemented using, by way of example, CMOS transistors or bidirectional gate buffers.

If CMOS transistors are used, a pair of transistors should be arranged symmetrically about a bus line. The transistors can thus perform the switching operation of connecting and disconnecting separate bus sections. Controller 20, shown in FIG. 1, can be used to control the gates of the transistors.

Figure 3:
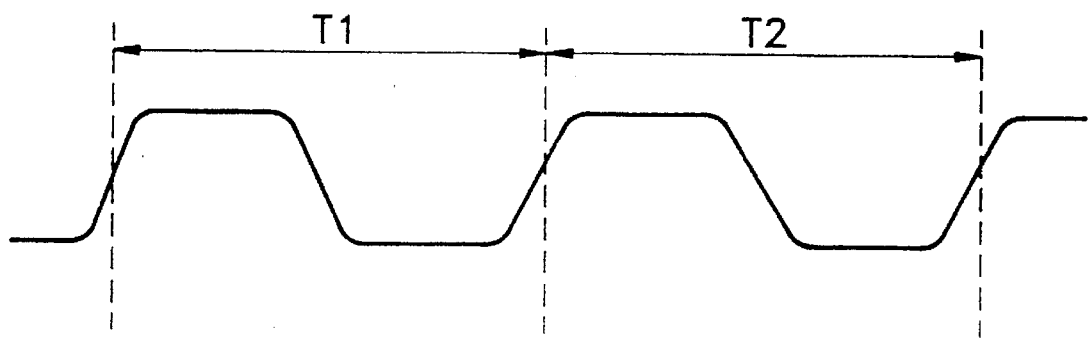
FIG.3 is a timing diagram of the clock pulse.

Referring to the timing diagram shown in FIG.3, the operation of the bus structure shown in FIG.2 will be described. If the instruction "move $100_1, 100_2$" is input, the data of block $100_1$ should be moved to block $100_2$. Typically, such an instruction word is decoded by an instruction word decoder (not shown) within the controller 20. When the instruction is executed, the controller 20 controls the data input/output control switches $110_1$ and $110_2$ of blocks $100_1$ and $100_2$ to turn on the respective switching transistors. Also, the respective switching transistors of bus control switches $120_2$ are all turned on. Therefore, only the paths between block $100_1$ and block $100_2$ are connected, thereby performing data transmission only between the relevant two blocks. In the same manner, when the instruction "move $100_2, 100_n$" which means the data of block $100_2$ should be moved to the block $100_n$, is executed, the transistors of data input/output control switches $110_2$ as are $110_n$ of the two blocks $100_2$ and $100_n$ are turned on and the transistors of the data input/output control switches $120_3, \ldots 120_n$ between block $100_2$ and block $100_n$ are turned on, thereby providing a bus for data transmission between desired blocks. The control operation by such control switches is performed during a clock period T1 or T2 of one cycle generated in the controller 20.

In the above configuration, the electricity consumed in transmitting data between near blocks and far blocks may be different, but the adverse effects of excess consumption of electricity can be prevented in design of the digital signal processor layout by centering the blocks used most frequently.

Therefore, data transmission between unit blocks inside a digital signal processor chip is performed according to the present invention by using a minimized number of isolatable bus sections, thereby preventing the unnecessary consumption of electricity in the unnecessary bus sections.

While the foregoing description sets forth many specific details, these are intended to be merely illustrative of the present invention. It will be readily apparent to those of skill in the art that many modifications may be made to the above description without departing from the spirit and scope of the invention, as defined by the appended claims and their equivalents.

What is claimed is:

1. A data transmission circuit for a digital signal processor chip having a plurality of function blocks, said data transmission circuit comprising:

a plurality of local buses each connected to a respective one of said plurality of function blocks;

a global bus including a plurality of global bus sections, each of said plurality of global bus sections being selectively electrically connectable to only a corresponding one of said plurality of local buses so that each of said plurality of local buses can transfer data between said respective one of said plurality of function blocks and a corresponding one of said plurality of global bus sections; and a plurality of first isolation switches each selectively electrically connecting and isolating two adjacent ones of said plurality of global bus sections, each of said plurality of first isolation switches being able to be operated simultaneously with at least one of the other of said plurality of said first isolation switches to permit data transmission through said two adjacent ones of said plurality of global bus sections.

2. The data transmission circuit according to claim 1, further comprising;

a plurality of second isolation switches each selectively electrically connecting and isolating a respective one of said plurality of local buses and said corresponding one of said plurality of global bus sections.

3. The data transmission circuit according to claim 2, wherein:

each of said plurality of first isolation switches are bidirectional gate buffers; and each of said plurality of second isolation switches are CMOS switching transistors.

4. The data transmission circuit according to claim 1, wherein:

said plurality of local buses are selectively electrically connectable between only said respective one of said plurality of function blocks and only said corresponding one of said plurality of global bus sections.

5. A method for transferring data in a digital signal processor chip having a plurality of function blocks, a global bus including a plurality of global bus sections which may be selectively electrically connected to each other, and a plurality of local buses which may be selectively electrically connected to both an associated one of said plurality of function blocks and an associated one of said plurality of global bus sections, the method comprising the steps of:

selectively electrically connecting a first one of said plurality of global bus sections to only a first one of said plurality of local buses;

selectively electrically connecting a second one of said plurality of global bus sections to only a second one of said plurality of local buses different from said first one of said plurality of local buses;

simultaneously selectively electrically connecting ones of said plurality of global bus sections located on said global bus between and including said first one of said plurality of global bus sections and said second one of said plurality of global bus sections; and transferring data between a first one of said plurality of function blocks and a second one of said plurality of function blocks via a data path established through said first one of said plurality of local buses, said first one of said plurality of global bus sections, said second one of said plurality of global bus sections, and said second one of said plurality of local buses.

6. The method for transferring data according to claim 5, wherein;

said step of selectively electrically connecting ones of said plurality of global bus sections connects at least three of said plurality of global bus sections.

7. The method for transferring data according to claim 5, wherein:

said step of selectively electrically connecting ones of said plurality of global bus sections connects only said first one of said plurality of global bus sections to said second one of said plurality of global bus sections.

8. A data transmission circuit for a digital signal processor chip having a plurality of function blocks, said data transmission circuit comprising:

a plurality of local buses each connected to a respective one of said plurality of function blocks;

a plurality of local bus isolation switches each selectively electrically connecting and isolating a respective one of said plurality of local buses and said corresponding one of said plurality of global bus sections;

a single global bus including a plurality of global bus sections, each of said plurality of global bus sections being selectively electrically connectable to only a corresponding one of said plurality of local buses so that each of said plurality of local buses can transfer data between said respective one of said plurality of function blocks and a corresponding one of said plurality of global bus sections; and a plurality of global bus isolation switches each selectively electrically connecting and isolating two adjacent ones of said plurality of global bus sections, each of said plurality of global bus isolation switches being able to be operated simultaneously with at least one of the other of said plurality of said first isolation switches to permit data transmission through said two adjacent ones of said plurality of global bus sections.

* * * * *